United States Patent Office 3,470,164
Patented Sept. 30, 1969

3,470,164
2-[2-(5-NITROFURYL)-VINYL]-AZOLES AND
PROCESS FOR PRODUCING THEREOF
Hideji Takamatsu, Hyogo-ken, Shinsaku Minami, Nara-ken, Jiro Aritomi, Osaka, Akio Fujita, Kamikyo-ku, Kyoto, Katsuro Fujimoto, Neyagawa-shi, Osaka-fu, and Masanao Shimizu and Yoshiyuki Takase, Hyogo-ken, Japan, assignors to Dainippon Pharmaceutical Co., Ltd., Osaka, Japan, a corporation of Japan
No Drawing. Filed Apr. 30, 1963, Ser. No. 277,045
Claims priority, application Japan, May 4, 1962, 37/18,402; May 24, 1962, 37/21,412; July 21, 1962, 37/31,051; Dec. 26, 1962, 37/58,920
Int. Cl. C07d 5/30, 85/36, 91/24
U.S. Cl. 260—240                           3 Claims This invention relates to a class of novel compounds and processes for producing thereof.

According to the present invention, there are provided novel 2-[2-(5-nitrofuryl)-vinyl]-azoles of the general formula

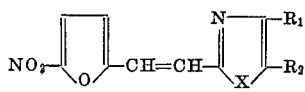

in which X is sulfur, oxygen or an imino group which may be substituted with acetyl, propionyl or a lower alkyl of 1 to 3 carbon atoms; each of $R_1$ and $R_2$, which may be the same or different, is hydrogen or a lower alkyl of 1 to 3 carbon atoms; and $R_1$ and $R_2$ when taken together is a butadienylene which forms an extended aromatic structure with the azole ring to which it is attached.

Examples of the new 2-[2-(5-nitrofuryl)-vinyl]-azoles of this invention are thiazoles such as 2-[2-(5-nitrofuryl)-vinyl] - thiazole, 2 - [2-(5-nitrofuryl)-vinyl]-4-methylthiazole, 2-[2-(5-nitrofuryl)-vinyl]-5-methylthiazole, 2-[2-(5-nitrofuryl)-vinyl]-4,5-dimethylthiazole, 2-[2-(5-nitrofuryl)-vinyl]-4-ethylthiazole, 2-[2-(5-nitrofuryl)-vinyl]-4-ethyl-5-methylthiazole, 2-[2-(5-nitrofuryl)-vinyl]-4,5-diethylthiazole, 2-[2-(5-nitrofuryl)-vinyl]-4-propylthiazole, 2-[2-(5-nitrofuryl)-vinyl]-4-isopropylthiazole and 2-[2-(5-nitrofuryl)-vinyl]-benzthiazole; corresponding oxazoles; corresponding imidazoles; corresponding 1-alkyl-imidazoles in which the 1-alkyl contains 1 to 3 carbon atoms; and corresponding 1-acylimidazoles in which the 1-acyl is an acetyl or a propionyl.

The novel 2-[2-(5-nitrofuryl)-vinyl]-azole can be prepared by condensing a suitable 2-methylazole and 5-nitrofurfural according to a process which itself is well known. The condensation reaction between 2-methylazole and 5-nitrofurfural can be easily effected at an elevated temperature in the presence of a condensing agent such as hydrochloric acid, sulfuric acid, acetic anhydride, zinc chloride and sodium carbonate, if necessary in an inert solvent, e.g., alcohols, acetic acid or benzene. Certain types of condensing agents function concurrently or subsequently as acylating agents also. Hence, when, for example, 2-[2-(5-nitrofuryl)-vinyl]-benzimidazole is the intended product, it can be obtained by heating a 2-methylbenzimidazole and 5-nitrofurfural in the presence of, say, acetic anhydride, thereby obtaining a mixture of the intended product and the 1-acetylated product thereof, and thereafter effecting the hydrolysis of this mixture by a process which itself is known, for example, by treating with hydrochloric acid.

1-acyl-2-[2-(5-nitrofuryl)-vinyl]-imidazoles, e.g., 1-acetyl-2-[2-(5-nitrofuryl)-vinyl]-benzimidazole, can also be made by (a) condensing 1-acetyl-2-methylbenzimidazole and 5-nitrofurfural; (b) condensing 2-methylbenzimidazole and 5-nitrofurfural in the presence of acetic anhydride; or (c) acetylating the 2-[2-(5-nitrofuryl)-vinyl]-benzimidazole with an acetylating agent such as acetic anhydride or acetic halides.

The following examples are given to illustrate the practice of the present invention, but are not to be construed as limiting. In the examples all temperatures are degrees centigrade, and unless otherwise specified, all parts are by weight.

Example 1

1.4 grams of 5-nitrofurfural and 1.2 grams of 2-methylbenzimidazole are dissolved in 10 cc. of acetic anhydride. After heating the mixture for 4 hours at 130°–140° C. and distilling off the excess acetic anhydride, 50 cc. of N-HCl is added, after which the mixture is heated on a water bath for 1½ hours. After filtering off the insoluble products, the filtrate is nuetralized with sodium bicarbonate. When the crystals which separate out are recrystallized from diluted alcohol, 2-[2-(5-nitrofuryl)-vinyl]-benzimidazole, M.P. 265° C. (dec.) is obtained.

Example 2

3.2 grams of 5-nitrofurfural and 3.5 grams of 1,2-dimethylbenzimidazole are dissolved in 20 cc. of acetic anhydride, followed by reacting with heating of the mixture for 3 hours at 130–140° C. After cooling, the mixture is poured into ice water. When the crystals which separate are recrystallized from alcohol, 5 grams of 1-methyl-2-[2-(5-nitrofuryl)-vinyl]-benzimidazole, M.P. 210°–211° C., is obtained.

Example 3

3 grams of 5-nitrofurfural and 2.5 grams of 2,4-dimethylthiazole are dissolved in 30 cc. of acetic anhydride, and the mixture is then heated for 3 hours at about 130° C. After distilling off the excess solvent under reduced pressure, water is added to the residue. Crystals which separate out are filtered off and recrystallized from a mixed solvent of acetone and water to give 2.5 grams of 2-[2-(5-nitrofuryl)-vinyl]-4-methylthiazole, M.P. 170°–171° C.

Example 4

A mixture of 2.1 grams of 5-nitrofurfural and 1.6 grams of 2,5-dimethyloxazole dissolved in 20 cc. of acetic anhydride was heated for 3 hours at about 120° C., after which the same treatment as in Example 3 is given, followed by recrystallizing from ethanol to give 1.5 grams of 2-[2-(5-nitrofuryl)-vinyl]-5-methyloxazole, M.P. 143°–144° C.

Example 5

2.5 grams of 2-[2-(5-nitrofuryl)-vinyl]-benzimidazole is heated together with 15 grams of acetic anhydride for 2 hours at 120°–130° C., after which the excess acetic anhydride is distilled off. When the residual crystals, after being thoroughly washed with water, are recrystallized from dioxane, 2.7 grams of 1-acetyl-2-[2-(5-nitrofuryl)-vinyl]-benzimidazole, M.P. 174°–175° C., is obtained.

Example 6

The reaction mixture reacted by heating 1.41 grams of 5-nitrofurfural and 1.3 grams of 2-methylbenzimidazole in 15 grams of acetic anhydride for 5 hours at 130° C. is poured into water. After heating a little to decompose the acetic anhydride, the crystals which separate out are filtered off, washed with water and thereafter recrystallized from dioxane to give 1.9 grams of the intended product 1-acetyl-2-[2-(5-nitrofuryl)-vinyl]-benzimidazole, M.P. 174°–175° C.

Example 7

When 1.4 grams of 5-nitrofurfural and 1.74 grams of 1-acetyl-2-methylbenzimidazole are heated together with 3 cc. of acetic anhydride, the excess solvent is distilled off under reduced pressure, the residue is thoroughly washed with water and recrystallization from dioxane is carried out, 2 grams of 1-acetyl-2-[2-(5-nitrofuryl-vinyl]-benzimidazole, M.P. 174°–175° C., is obtained.

Example 8

1.4 grams of 5-nitrofurfural and 1.5 grams of 2-methylbenzothiazole are dissolved in 5 cc. of acetic anhydride, following which the mixture is heated for about 1 hour at 130°–140° C. and then concentrated under reduced pressure. After cooling the mixture, the crystals separating out are filtered off. When these crystals are recrystallized from a mixed solvent of dioxane and water, 1.5 grams of the intended 2-[2-(5-nitrofuryl)-vinyl]-benzothiazole, M.P. 202°–204° C., is obtained.

Example 9

A mixture of 1.4 grams of 5-nitrofurfural and 1.3 grams of 2-methylbenzoxazole dissolved in 5 cc. of acetic anhydride is heated for about 7 hours at 130°–140° C., followed by treating as in Example 8. When the crystals so obtained are recrystallized from benzene, 1.3 grams of the intended 2-[2-(5-nitrofuryl)-vinyl]-benzoxazole, M.P. 225°–227° C., is obtained.

The new 2-[2-(5-nitrofuryl)-vinyl]-azoles have high activities against important gram positive and gram negative strains of pathogenic bacteria such as *Micrococcus pyrogenes* var. *aureus, Streptococcus hemolyticus, Escherichia coli, Shigella flexneri* and *Salmonella typhosa*. Further, these compounds have antimycotic and antitrichomonal activities. It can be expected that these 2-[2-(5-nitrofuryl)-vinyl]-azoles are useful in the treatment of bacterial, fungal and protozoal infections in man and domestic animals.

The following Table I summarizes the in vitro activities of 2-[2-(5-nitrofuryl)-vinyl]-azoles against a variety of microorganisms. The minimum inhibitory concentration (MIC) was determined by the well known serial dilution technique.

TABLE I.—IN VITRO ACTIVITIES

| Organism | MIC (γ/ml.) of— | | | | |
|---|---|---|---|---|---|
| | NF:120 | NF:131 | NF:136 | NF:138 | NF:141 |
| *Micro. pyrogenes* var. *aureus* | 0.3 | 10 | 10 | 1 | 1 |
| *Strept. hemoly.* | 0.1 | 10 | 100 | 1 | 0.1 |
| *E. coli* | 0.3 | 0.3 | 0.3 | 1 | 0.3 |
| *Salm. typhimurium* | 1 | 1 | 0.3 | 1 | 0.3 |
| *Shig. flexneri 2a* | 1 | 1 | 1 | 3 | 1 |
| *Mycob. tuberculosis* | 3 | 3 | 3 | 1 | 3 |
| *Cryp. neoformans* | | 0.3 | 0.1 | 0.3 | |
| *Trich. mentagrophytes* | | 1 | 1 | 1 | |
| *Sacch. rouxii* | | 3 | 3 | 10 | |
| *Trichomonas vaginalis 4F* | 0.3 | 1 | 0.3 | 1 | 1 |

Note.—NF:120—2-[2-(5-nitrofuryl)-vinyl]-benzimidazole; NF:131—2-[2-(5-nitrofuryl)-vinyl]-4-methylthiazole; NF:136—2-[2-(5-nitrofuryl)-vinyl]-5-methyloxazole; NF:138—1-methyl-2-[2-(5-nitrofuryl)-vinyl]-benzimidazole; NF:141—1-acetyl-2-[2-(5-nitrofuryl)-vinyl]-benzimidazole Acute toxicities of the new azoles are shown in Table II.

TABLE II

[$LD_{50}$ (mg./kg.) in mice]

| Compounds | ip | po |
|---|---|---|
| NF:120 | 1,000 | 1,650 |
| NF:131 | >2,000 | >2,000 |
| NF:136 | 875 | >2,000 |
| NF:138 | 1,150 | 1,000 |
| NF:141 | 850 | 1,025 |

What is claimed is:
1. 2-[2-(5-nitrofuryl)-vinyl]-benzimidazole.
2. 1-methyl-2-[2-(5-nitrofuryl)-vinyl]-benzimidazole.
3. 1-acetyl-2-[2-(5-nitrofuryl)-vinyl]-benzimidazole.

References Cited

FOREIGN PATENTS 584,482  1/1947  Great Britain.

OTHER REFERENCES

Takahashi et al., J. Pharm. Soc. Japan, vol. 72, pages 463 to 467 (1952).

Ried et al., Annalen der Chemie, vol. 600, pages 47 to 59 (1956).

JOHN D. RANDOLPH, Primary Examiner

U.S. Cl. X.R.

260—999